US006210459B1

(12) United States Patent
Sanders

(10) Patent No.: US 6,210,459 B1
(45) Date of Patent: *Apr. 3, 2001

(54) SOIL NUTRIENT COMPOSITIONS AND METHODS OF USING SAME

(76) Inventor: John Larry Sanders, 13044 W. Choctaw Trail, Lockport, IL (US) 60441

( * ) Notice: Subject to any disclaimer, the term of this patent is extended or adjusted under 35 U.S.C. 154(b) by 0 days.

This patent is subject to a terminal disclaimer.

(21) Appl. No.: 09/604,137

(22) Filed: Jun. 27, 2000

Related U.S. Application Data

(63) Continuation of application No. 09/162,013, filed on Sep. 28, 1998, now Pat. No. 6,132,485.

(51) Int. Cl.⁷ ....................................... C05D 9/02

(52) U.S. Cl. ................... 71/61; 71/63; 71/64.13

(58) Field of Search ................ 71/63, 61, 64.13

(56) References Cited

U.S. PATENT DOCUMENTS 5,571,303 * 11/1996 Bexton ..................................... 71/34

* cited by examiner

*Primary Examiner*—Wayne Langel
(74) *Attorney, Agent, or Firm*—Hovey, Williams, Timmons & Collins

(57) ABSTRACT

Compositions and methods for lowering the pH of soil are provided wherein the compositions comprise ammonium sulfate, elemental sulfur, and a micronutrient selected from the group consisting of zinc, iron, manganese, copper, boron, cobalt, vanadium, selenium, silicon, nickel, and mixtures thereof. In the preferred embodiment, the compositions are in granulated form and are applied to the soil so as to create lower pH microenvironments within the soil without decreasing the pH of the overall bulk soil surrounding the microenvironments. In the microenvironments, the micronutrients are readily available to the roots of plants and are taken up by the plants with increased efficiency, thus reducing the quantity of micronutrients required to be applied to the soil.

44 Claims, No Drawings

SOIL NUTRIENT COMPOSITIONS AND METHODS OF USING SAME

This application is a continuation of prior application Ser. No. 09/162,013, Sep. 28, 1998, U.S. Pat. No. 6,132,485.

BACKGROUND OF THE INVENTION

1. Field of the Invention

The present invention is broadly concerned with compositions and methods for lowering the pH of soil microenvironments so as to increase the micronutrient uptake of growing plants. The compositions of the invention are preferably granulated and comprise ammonium sulfate, elemental sulfur, and a micronutrient selected from the group consisting of zinc, iron, manganese, copper, boron, cobalt, vanadium, selenium, silicon, nickel, and mixtures thereof. In the preferred methods of the invention, granulated compositions are applied to the soil resulting in the formation of acidic soil micro-environments, while the soil surrounding the microenvironments retains its original pH. Such localized low pH conditions lead to an increased availability and plant uptake of the important micronutrients. In an alternative embodiment, non-granulated compositions can be utilized when it is desirable to decrease the overall pH of bulk soil.

2. Description of the Prior Art

In order to maintain healthy growth, plants must extract a variety of elements from the soil in which they grow. These elements include the so-called micronutrients zinc, iron, manganese, copper, boron, cobalt, vanadium, selenium, silicon, and nickel. However, many soils lack sufficient quantities of these micronutrients or contain them only in forms which can not be readily taken up by plants. To counteract these deficiencies, sources of the deficient element(s) are commonly applied to soils in order to improve growth rates and yields obtained from crop plants. This application has generally been accomplished using oxides, sulfates, oxysulfates, chelates, and other formulations.

In ordinary agricultural soil, pH's vary from about 4.5 to 8.3. Soils having pH's below 6.5 are normally subjected to liming to bring the pH of the soil to neutral or near-neutral. Liming is necessary for the availability of many macronutrients (such as nitrate, phosphates, magnesium, and especially calcium). However, when lime is applied, the availability of micronutrients is generally decreased due to the formation of insoluble products. This is especially true if over-liming occurs. Similarly, fields with naturally occurring pH's in excess of 7 have restricted availability of micronutrients due to the formation therein of insoluble reaction products (fixation). It is known that the availability of most micronutrients increases as the pH decreases. In the past it has been impractical to utilize the knowledge that an acid environment can provide enhanced availability of micronutrients. One reason is that, although micronutrient availability is enhanced by low pH's, maximum crop yields are normally obtainable at higher pH's.

In order to compensate for the lack of available micronutrients, many farmers apply excess amounts of fertilizers containing those micronutrients to the soil. Farmers may however apply expensive foliar applications which may solve the problems, but at a high cost to the farmer. The micronutrients (which are generally fixed or become unavailable when applied to soils) often limit the uptake of the macronutrients. The macronutrients may then wash off or leach out of the soil and contaminate the groundwater or surface water.

SUMMARY OF THE INVENTION

The instant invention overcomes the problems described above by combining ammonium sulfate, elemental sulfur, and micronutrients into compositions capable of providing an acid-forming microenvironment in soil, without decreasing the overall bulk soil pH. Preferably, the compositions are granular in form to provide the low pH high micronutrient uptake soil microenvironments. Alternately, if it is desirable to decrease the overall bulk soil pH, non-granulated compositions (i.e., a fine particle mixture) can be used.

In more detail, the micronutrient compositions of the invention (both granulated and non-granulated) comprise ammonium sulfate, elemental sulfur, and a micronutrient selected from the group consisting of zinc, iron, manganese, copper, boron, cobalt, vanadium, selenium, silicon, nickel, and mixtures thereof. Preferred micronutrients are zinc, boron, iron, copper, and manganese, with zinc, boron, iron, and manganese being particularly preferred. The preferred ranges of concentrations of each of the components of the compositions are set forth in Table 1.

While the non-granulated composition itself is useful for decreasing the overall pH of the bulk soil, it is a particular advantage of the instant invention that the composition can be formed into granules for situations where it is desirable to decrease the pH in only small portions of the soil, while not affecting the overall bulk soil pH. Broadly, granulated composites in accordance with the invention can be formed by granulating a mixture comprising ammonium sulfate, elemental sulfur, and a micronutrient selected from the group consisting of zinc, iron, manganese, copper, boron, cobalt, vanadium, selenium, silicon, nickel, and mixtures thereof. The granulation of the mixture can be carried out using any known granulation method. One preferred method of forming granulated composites in accordance with the invention involves mixing ammonium sulfate, elemental sulfur, and the desired micronutrient(s) to form a mixture, and then adding a chemical reactant to the mixture. Suitable chemical reactants include sulfuric acid, phosphoric acid, or anhydrous ammonia (or any chemical reactant which will react with the mixture to generate heat and thus initiate a chemical binding reaction). The resulting mixture is then processed in any granulation machinery known in the art, including but not limited to rotary drum granulators, rotary pan granulators, fluid bed granulators, or prilling towers. As the chemical reactions proceed, the granules will harden.

If a physical granulation method is preferred, the same procedure can be followed as described above for chemical granulation with the exception that, instead of adding a chemical reactant to the mixture, a binding agent (such as lignosulfonates or attapulgite clay) is added to the mixture. If the use of physical or chemical binding agents is not desirable, the ammonium sulfate, elemental sulfur, and desired micronutrient(s) can be ground to a relatively fine mesh size (generally from about 0.005 mm to about 1.0 mm) and mixed together. The resulting mixture is then processed through rollers exerting pressures onto the mixtures of from about 20,000 to about 60,000 lbs/in$^2$. The sheets or ribbons of processed material are broken into small pieces by a chain mill or other device. These pieces can then be screened into groups of uniform sizes before drying.

The preferred micronutrients and the preferred concentration ranges of the components making up the granulated composites are the same as those described for the non-granulated composites above. The micronutrient granules of the instant invention should have a bulk density of from about 30–100 lbs/ft$^3$, preferably from about 45–85 lbs/ft$^3$, and more preferably about 60 lbs/ft³. The granules should have a water solubility of from about 10–100%, preferably from about 20–95%, and more preferably from about 25–90%. The largest surface dimension of the granules is preferably from about 0.1–30 mm, more preferably from about 0.1–3.0 mm, and most preferably from about 1.5–3.0 mm. While these ranges are preferred, those skilled in the art will recognize that the granule size can be varied according to the crop with which it will be used.

The granulated and non-granulated composites of the invention can be applied to the soil by any method known in the art which suits the needs of the farmer, including by broadcast application, banded application, sidedress application, with-the-seed applications, or any combination of these application methods.

While the non-granulated compositions will decrease the overall bulk soil pH, the granulated composites provide intimate contact between the components of the granules, resulting in a unique, localized acid microenvironment that increases the availability of the micronutrients (i.e., zinc, iron, manganese, copper, boron, cobalt, vanadium, selenium, silicon, nickel). When applied to the soil as a fertilizer, the microenvironment will have a pH distinct from the pH of the bulk soil surrounding the microenvironment. As the plant roots randomly grow throughout the soil, they will encounter these microenvironments, allowing access to the readily available micronutrients while simultaneously permitting the roots to absorb other nutrients (such as nitrogen or phosphorous) from the non-acidified bulk soil surrounding the microenvironment.

When the granulated composites of the invention are applied to soil, the resulting microenvironments should have a soil pH of from about 3–7, preferably from about 4–6, and more preferably from about 5–6. Expressed another way, the pH within the microenvironments should be from about 1–4, and preferably from about 2–3 pH units lower than the pH of the bulk soil (i.e., soil surrounding the microenvironments but whose pH has been essentially unaffected by the granules). The pH of the microenvironment should remain acidic (i.e., pH of less than 7) for at least about 30 days, preferably at least about 60 days, and more preferably for from about 90–120 days after the granule has been contacted with the soil. The granulated composites can be randomly distributed throughout the soil (as are the roots of the growing plants), however, it is preferred that the granulated composites be distributed in a quantity such that a sufficient number of low pH microenvironments are formed to allow an adequate number of plant roots to contact the microenvironment, and thus access the readily available micronutrients. Therefore, it is preferred that there be from about 1–100 microenvironments per cubic foot of soil, more preferably from about 10–50 microenvironments per cubic foot of soil, and most preferably from about 12–40 microenviromnents per cubic foot of soil. Preferably, the microenvironments (formed by granules whose largest surface dimensions are from about 1.5–3.0 mm) are of such a size that the largest dimensions of the microenvironment average from about 5–10 mm, more preferably from about 4–8 mm, and most preferably from about 3–6 mm.

Because the microenvironments are acidic, the micronutrients from the granules are more readily available, and thus are more efficiently taken up by the plant roots. Those skilled in the art will appreciate that this efficiency allows for a substantial decrease in the quantity of micronutrients required, saving money for the farmer.

Specifically, use of the granulated composites in accordance with the methods of the invention results in a decrease of at least about 25% by weight per acre, preferably at least about 35% by weight per acre, and more preferably at least about 50% by weight per acre, in the quantity of at least one of the micronutrients within the composites in comparison to the quantity of the respective micronutrient which would be required using compositions and methods known in the art.

TABLE 1

| Component | Broad Range[a] | Preferred[a] |
|---|---|---|
| ammonium sulfate | 5–49% by wt. | 10–25% by wt. |
| elemental sulfur | 2.5–49% by wt. | 5–25% by wt. |
| zinc | 0.02–74% by wt. | 1–40% by wt. |
| manganese | 0.02–55% by wt. | 2–40% by wt. |
| copper | 0.02–74% by wt. | 1–40% by wt. |
| iron | 0.02–55% by wt. | 1–40% by wt. |
| boron | 0.02–18% by wt. | 0.05–12% by wt. |
| nickel | 0.015–0.025% by wt. | 0.01–0.02% by wt. |
| cobalt | 0.002–0.02% by wt. | 0.005–0.01% by wt. |
| silicon | 1–25% by wt. | about 20% by wt. |
| selenium | 0.005–0.2% by wt. | about 0.125% by wt. |
| vanadium | 0.005–0.2% by wt. | about 0.09% by wt. |
| sulfuric acid | 5–25% by wt. | 10–15% by wt. |

[a]Approximate percent by weight, based upon the total weight of the composition taken as 100% by weight.

DETAILED DESCRIPTION OF THE PREFERRED EMBODIMENTS

EXAMPLES

The following examples set forth preferred methods in accordance with the invention. It is to be understood, however, that these examples are provided by way of illustration and nothing therein should be taken as a limitation upon the overall scope of the invention.

Example 1

Preparation of a 20% Copper Micronutrient Composition

The following ingredients were added to a rotary drum granulator and mixed until substantially homogeneous: 400 lbs of ammonium sulfate; 818 lbs of zinc oxide reactant (10% zinc); 432 lbs copper oxide; and 200 lbs elemental sulfur. After mixing, 286 lbs of sulfuric acid was added to the mixture in the granulator to form a semi-liquid slurry. The granulator (which was angled with its mouth positioned slightly above the horizontal) was then rotated in order to form the slurry into granules. As the granules reached the appropriate size, they rolled out of the mouth of the granulator drum. The formed granules were heated in a dryer (to approximately 200–250° F.) causing the excess moisture to evaporate and hardening the granule. After drying, the granules were passed over a series of vibrating screens in order to obtain only granules having a size of from 1.5–3.0 mm. The granules outside this size range were then crushed and reprocessed as described above. Those granules having the appropriate sizes were then sprayed with a coating of lignosulfonate in order to increase hardness and reduce dust formation.

Example 2

Preparation of a 20% Zinc Micronutrient Composition

The following ingredients were mixed in a pug mill mixer mixed until substantially homogeneous: 400 lbs of ammonium sulfate; 854 lbs of zinc oxide reactant (10% zinc); 397 lbs zinc oxide (76% zinc); and 200 lbs elemental sulfur. The resulting mixture was added to a rotary drum granulator, followed by the addition of 286 lbs of sulfuric acid to the granulator. All of the ingredients were mixed in the granulator until a semi-liquid slurry was formed. The granulator was then rotated in order to form the slurry into granules, which then exited the mouth of the drum (positioned slightly above the horizontal). The formed granules were heated in a dryer (to approximately 200–250° F.) evaporating the excess moisture and hardening the granules. After drying, the granules were passed over a series of vibrating screens in order to obtain granules having a size of at least 3.0 mm. The granules outside this size range were then crushed and reprocessed as described above. Those granules having the appropriate size were sprayed with a coating of lignosulfonate.

Example 3

Tests were conducted to determine the effects of various micronutrient combinations on soil pH's and micronutrient uptakes by soybeans. Those combinations were: ammonium sulfate with a micronutrient mix; elemental sulfur with a micronutrient mix; and a combination of ammonium sulfate and elemental sulfur with a micronutrient mix. The micronutrient mixes contained Zn, Fe, Mn, and Cu in such amounts that the following quantities of each were applied per acre: 1 lb Zn, 0.5 lb Fe, 0.5 lb Mn, and 0.5 lb Cu. In each run, twenty pounds of sulfur was applied to each acre of soil. The sulfur applied in each run was obtained in the following variations: twenty pounds of sulfur from $(NH_4)_2SO_4$; twenty pounds of sulfur that was elemental sulfur; and a combination of ten pounds of sulfur from $(NH_4)_2SO_4$ and ten pounds of sulfur that was elemental sulfur. Each combination was applied to the soil by banded applications at planting. The soil pH and leaf tissue was tested at 60 days after planting. The results from these tests are set forth in Table 2 below. Treatment (III) decreased the soil pH 0.5 units more than treatment (I), and treatment (III) decreased the soil pH 1.2 units more than treatment (II). This in turn led to a large increase in the uptake of Zn, Fe, Mn, and Cu by the plant subjected to treatment (III) in comparison to those plants subjected to treatments (I) or (II).

TABLE 2

| Treatment | Soil pH | Soybean Uptake - ppm | | | |
|---|---|---|---|---|---|
| | | Zn | Fe | Mn | Cu |
| Control | 7.4 | 37 | 70 | 48 | 5 |
| (I) 20 lbs. from $(NH_4)_2SO$[a] | 6.1 | 42 | 98 | 73 | 7 |
| (II) 20 lbs. from S[b] | 6.8 | 39 | 84 | 57 | 6 |
| (III) 20 lbs. Combination[c] | 5.6 | 49 | 160 | 82 | 9 |

[a]Twenty pounds of sulfur per acre, with the sulfur being obtained from (NH4)2SO4.
[b]Twenty pounds of sulfur per acre, with the sulfur being elemental sulfur.
[c]Twenty pounds of sulfur per acre, with ten pounds of the sulfur being obtained from (NH4)2SO4 and ten pounds of the sulfur being elemental sulfur.

I claim:

1. A soil nutrient composition comprising ammonium sulfate, elemental sulfur, and a micronutrient selected from the group consisting of zinc, iron, manganese, copper, boron, cobalt, vanadium, selenium, silicon, nickel and mixtures thereof, the amount of ammonium sulfate present in said composition being greater than the amount of elemental sulfur therein, on a weight basis.

2. The composition of claim 1, said micronutrient selected from the group consisting of zinc, boron, iron, copper, manganese and mixtures thereof.

3. The composition of claim 1, wherein said composition comprises from about 5–49% by weight ammonium sulfate, and from about 2.5–49% by weight elemental sulfur, based upon the total weight of the composition taken as 100% by weight.

4. The composition of claim 1, said composition being granulated.

5. A composite comprising a self-sustaining body formed of a mixture comprising ammonium sulfate, elemental sulfur, and a micronutrient selected from the group consisting of zinc, iron, manganese, copper, boron, cobalt, vanadium, selenium, silicon, nickel and mixtures thereof, the amount of ammonium sulfate present in said composite being greater than the amount of elemental sulfur therein, on a weight basis.

6. The composite of claim 5, said micronutrient selected from the group consisting of zinc, boron, iron, copper, manganese and mixtures thereof.

7. The composite of claim 5, wherein said composite comprises from about 5–49% by weight ammonium sulfate, and from about 2.5–49% by weight elemental sulfur, based upon the total weight of the composite taken as 100% by weight.

8. The composite of claim 5, said body being a granule.

9. The composite of claim 5, said body having a water solubility of about 10–100%.

10. The composite of claim 5, a plurality of said bodies having a bulk density of from about 30–100 lbs/ft.$^3$.

11. A method of providing nutrients to soil comprising the steps of:

providing a soil nutrient composition comprising ammonium sulfate, elemental sulfur, and a micronutrient selected from the group consisting of zinc, iron, manganese, copper, boron, cobalt, vanadium, selenium, silicon, nickel and mixtures thereof, the amount of ammonium sulfate present in said composition being greater than the amount of elemental sulfur therein, on a weight basis; and contacting said composition with said soil.

12. The method of claim 11, said micronutrient selected from the group consisting of zinc, boron, iron, copper, manganese and mixtures thereof.

13. The method of claim 11, wherein said composition comprises from about 5–49% by weight ammonium sulfate, and from about 2.5–49% by weight elemental sulfur, based upon the total weight of the composition taken as 100% by weight.

14. The method of claim 11, said composition being granulated.

15. The method of claim 11, wherein said contacting step comprises the step of substantially uniformly spreading said composition on said soil.

16. The method of claim 15, wherein said contacting step further comprises the step of incorporating said composition into said soil.

17. A soil nutrient composition comprising ammonium sulfate, elemental sulfur, and a micronutrient selected from the group consisting of zinc, iron, manganese, copper and mixtures thereof, said micronutrient being present in said composition at a level of from 4.62% to about 74% by weight, the maximum amount of zinc in said composition being about 74% by weight, the maximum amount of manganese present in said composition being about 55% by weight, the maximum amount of copper present in said composition being about 74% by weight, and the maximum amount of iron present in said composition being about 55% by weight.

18. The composition of claim 17, said ammonium sulfate being present in said composition in an amount greater than the amount of elemental sulfur therein, on a weight basis.

19. A method of providing nutrients to soil comprising the steps of:

providing a soil nutrient composition comprising ammonium sulfate, elemental sulfur, and a micronutrient selected from the group consisting of zinc, iron, manganese, copper, boron, cobalt, vanadium, selenium, silicon, nickel and mixtures thereof, said micronutrient being present in said composition at a level of from 4.62% to about 74% by weight, the maximum amount of zinc in said composition being about 74% by weight, the maximum amount of manganese present in said composition being up to about 55% by weight, the maximum amount of copper present in said composition being about 74% by weight, and the maximum amount of iron present in said composition being about 55% by weight; and contacting said composition with said soil.

20. The method of claim 19, said micronutrient selected from the group consisting of zinc, boron, iron, copper, manganese and mixtures thereof.

21. The method of claim 19, wherein said composition comprises from about 5–49% by weight ammonium sulfate, and from about 2.5–49% by weight elemental sulfur, based upon the total weight of the composition taken as 100% by weight.

22. The method of claim 19, said composition being granulated.

23. The method of claim 19, wherein said contacting step comprises the step of substantially uniformly spreading said composition on said soil.

24. The method of claim 19, wherein said contacting step further comprises the step of incorporating said composition into said soil.

25. A soil nutrient composition comprising ammonium sulfate, elemental sulfur, and boron micronutrient present at a level of from about 0.02–18% by weight.

26. The composition of claim 25, said boron present at a level of from about 0.05–12% by weight.

27. The composition of claim 25, the amount of ammonium sulfate present in said composition being greater than the amount of elemental sulfur therein, on a weight basis.

28. A method of providing nutrients to the soil comprising the steps of:

providing a nutrient composition comprising ammonium sulfate, elemental sulfur, and boron micronutrient present at a level of from about 0.02–18% by weight; and contacting said composition with said soil.

29. A soil nutrient composition comprising ammonium sulfate, elemental sulfur, and a micronutrient selected from the group consisting of zinc, iron, manganese, copper, boron, cobalt, vanadium, selenium, silicon, nickel and mixtures thereof, said elemental sulfur being present in an amount of from 2.5–49% by weight, based upon the total weight of the composition taken as 100% by weight.

30. The composition of claim 29, said sulfur being present at a level of from 5–25% by weight.

31. The composition of claim 29, said composition being granulated.

32. The composition of claim 29, said ammonium sulfate being present at a level of from 5–49% by weight, based upon the total weight of the composition taken as 100% by weight.

33. The composition of claim 29, said micronutrient selected from the group consisting of zinc, boron, iron, copper, manganese and mixtures thereof.

34. A composite comprising a self-sustaining body formed of a mixture comprising ammonium sulfate, elemental sulfur, and a micronutrient selected from the group consisting of zinc, iron, manganese, copper, boron, cobalt, vanadium, selenium, silicon, nickel and mixtures thereof, said elemental sulfur being present in an amount of from 2.5–49% by weight, based upon the total weight of the composition taken as 100% by weight.

35. The composite of claim 34, said sulfur being present at a level of from 5–25% by weight.

36. The composite of claim 34, said composition being granulated.

37. The composite of claim 34, said ammonium sulfate being present at a level of from 5–49% by weight, based upon the total weight of the composition taken as 100% by weight.

38. The composition of claim 34, said micronutrient selected from the group consisting of zinc, boron, iron, copper, manganese and mixtures thereof.

39. A method of providing nutrients to soil comprising the steps of:

providing a soil nutrient composition comprising ammonium sulfate, elemental sulfur, and a micronutrient selected from the group consisting of zinc, iron, manganese, copper, boron, cobalt, vanadium, selenium, silicon, nickel and mixtures thereof, said elemental sulfur being present in an amount of from 2.5–49% by weight, based upon the total weight of the composition taken as 100% by weight; and contacting said composition with said soil.

40. The method of claim 39, said micronutrient selected from the group consisting of zinc, boron, iron, copper, manganese and mixtures thereof.

41. The method of claim 39, wherein said composition comprises from about 5–49% by weight ammonium sulfate, and from 2.5–49% by weight elemental sulfur, based upon the total weight of the composition taken as 100% by weight.

42. The method of claim 39, said composition being granulated.

43. The method of claim 39, wherein said contacting step comprises the step of substantially uniformly spreading said composition on said soil.

44. The method of claim 43, wherein said contacting step further comprises the step of incorporating said composition into said soil.

* * * * *

(12) EX PARTE REEXAMINATION CERTIFICATE (9331st)
United States Patent
Sanders

(10) Number: US 6,210,459 C1
(45) Certificate Issued: *Oct. 4, 2012

(54) SOIL NUTRIENT COMPOSITIONS AND METHODS OF USING SAME

(75) Inventor: John Larry Sanders, Lockport, IL (US)

(73) Assignee: Specialty Fertilizer Products, LLC, Leawood, KS (US)

Reexamination Request:
No. 90/011,759, Jun. 27, 2011

Reexamination Certificate for:
Patent No.: 6,210,459
Issued: Apr. 3, 2001
Appl. No.: 09/604,137
Filed: Jun. 27, 2000

(*) Notice: This patent is subject to a terminal disclaimer.

Related U.S. Application Data

(63) Continuation of application No. 09/162,013, filed on Sep. 28, 1998, now Pat. No. 6,132,485.

(51) Int. Cl.
*C05C 3/00* (2006.01)

(52) U.S. Cl. ................................ 71/61; 71/63; 71/64.13

(58) Field of Classification Search .................. None
See application file for complete search history.

(56) References Cited

To view the complete listing of prior art documents cited during the proceeding for Reexamination Control Number 90/011,759, please refer to the USPTO's public Patent Application Information Retrieval (PAIR) system under the Display References tab.

*Primary Examiner* — Elizabeth McKane

(57) ABSTRACT

Compositions and methods for lowering the pH of soil are provided wherein the compositions comprise ammonium sulfate, elemental sulfur, and a micronutrient selected from the group consisting of zinc, iron, manganese, copper, boron, cobalt, vanadium, selenium, silicon, nickel, and mixtures thereof. In the preferred embodiment, the compositions are in granulated form and are applied to the soil so as to create lower pH microenvironments within the soil without decreasing the pH of the overall bulk soil surrounding the microenvironments. In the microenvironments, the micronutrients are readily available to the roots of plants and are taken up by the plants with increased efficiency, thus reducing the quantity of micronutrients required to be applied to the soil.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 17-44 are now disclaimed.

Claims 1, 3, 5, 7, 11 and 13 are cancelled.

Claims 2, 4, 6, 8-10, 12, 14 and 15 are determined to be patentable as amended.

Claim 16, dependent on an amended claim, is determined to be patentable.

New claims 45-156 are added and determined to be patentable.

2. The composition of claim [1] *4*, said micronutrient selected from the group consisting of zinc, boron, iron, copper, manganese and mixtures thereof.

4. [The] *A soil nutrient* composition [of claim 1, said composition] *comprising a mixture of from about 5-49% by weight ammonium sulfate based upon the total weight of the composition taken as 100% by weight, from about 2.5-25% by weight elemental sulfur based upon the total weight of the composition taken as 100% by weight, and a micronutrient selected from the group consisting of zinc, iron, manganese, copper, boron, cobalt, vanadium, selenium, silicon, nickel and mixtures thereof, the amount of ammonium sulfate present in said composition being greater than the amount of elemental sulfur therein, on a weight basis, said composition being granulated using equipment comprising a rotary drum granulator or a rotary pan granulator to form granules having a size of from about 0.1-30 mm, said granules having a moisture content as formed and are thereafter dried, said granules operable when applied to soil to create lower pH portions within the soil.*

6. The composite of claim [5] *8*, said micronutrient selected from the group consisting of zinc, boron, iron, copper, manganese and mixtures thereof.

8. [The] *A* composite [of claim 5,] *comprising a self-sustaining body formed of a mixture comprising from about 5-49% by weight ammonium sulfate based upon the total weight of the composite taken as 100% by weight, from about 2.5-25% by weight elemental sulfur based upon the total weight of the composite taken as 100% by weight, and a micronutrient selected from the group consisting of zinc, iron, manganese, copper, boron, cobalt, vanadium, selenium, silicon, nickel and mixtures thereof, the amount of ammonium sulfate present in said composite being greater than the amount of elemental sulfur therein, on a weight basis,* said body being a granule *formed using equipment comprising a rotary drum granulator or a rotary pan granulator to form granules having a size of from about 0.1-30 mm, said granules having a moisture content as formed and are thereafter dried, said granules operable when applied to soil to create lower pH portions within the soil.*

9. The composite of claim [5] *8*, said body having a water solubility of about 10-100%.

10. The composite of claim [5] *8*, a plurality said bodies having a bulk density of from about 30-100 lbs/ft.$^3$.

12. The method of claim [11] *14*, said micronutrient selected from the group consisting of zinc, boron, iron, copper, manganese and mixtures thereof.

14. [The method of claim 11] *A method of providing nutrients to soil comprising the steps of:*

*providing a soil nutrient composition comprising a mixture of from about 5-49% by weight ammonium sulfate based upon the total weight of the composition taken as 100% by weight, from about 2.5-25% by weight elemental sulfur based upon the total weight of the composition taken as 100% by weight, and a micronutrient selected from the group consisting of zinc, iron, manganese, copper, boron, cobalt, vanadium, selenium, silicon, nickel and mixtures thereof, the amount of ammonium sulfate present in said composition being greater than the amount of elemental sulfur therein, on a weight basis, said composition being granulated using equipment comprising a rotary drum granulator or a rotary pan granulator to form granules having a size of from about 0.1-30 mm, said granules having a moisture content as formed and are thereafter dried, said granules operable when applied to soil to create lower pH portions within the soil; and* contacting said [composition] *granules* with said soil.

15. The method of claim [11] *14*, wherein said contacting step comprises the step of substantially uniformly spreading said [composition] *granules* on said soil.

*45. The composition of claim 4, said size being from about 0.1-3 mm.*

*46. The composition of claim 45, said size being from about 1.5-3 mm.*

*47. The composition of claim 4, said granules operable to increase the plant availability of said micronutrient.*

*48. The composition of claim 4, said lower pH portions being acidic microenvironments.*

*49. The composition of claim 48, said microenvironments having a largest dimension averaging from about 4-8 mm.*

*50. The composition of claim 48, said acidic microenivronments being maintained for a period of at least about 30 days.*

*51. The composition of claim 4, said composition including phosphorous.*

*52. The composition of claim 4, including from about 0.02-74% by wt. zinc.*

*53. The composition of claim 52, including from about 1-40% by wt. zinc.*

*54. The composition of claim 4, including from about 0.02-55% by wt. manganese.*

*55. The composition of claim 54, including from about 2-40% by wt. manganese.*

*56. The composition of claim 4, including from about 0.02-74% by wt. copper.*

*57. The composition of claim 56, including from about 1-40% by wt. copper.*

*58. The composition of claim 4, including from about 0.02-55% by wt. iron.*

*59. The composition of claim 58, including from about 1-40% by wt. iron.*

*60. The composition of claim 4, including from about 0.02-18% by wt. boron.*

*61. The composition of claim 60, including from about 0.05-12% by wt. boron.*

*62. The composition of claim 4, including from about 0.015-0.025% by wt. nickel.*

*63. The composition of claim 62, including from bout 0.01-0.02% by wt. nickel.*

64. The composition of claim 4, including from about 0.002-0.02% by wt. cobalt.

65. The composition of claim 64, including from about 0.005-0.01% by wt. cobalt.

66. The composition of claim 4, including from about 1-25% by wt. silicon.

67. The composition of claim 66, including about 20% by wt. silicon.

68. The composition of claim 4, including from about 0.005-0.2% by wt. selenium.

69. The composition of claim 68, including about 0.125% by wt. selenium.

70. The composition of claim 4 including from about 0.005-0.2% by wt. vanadium.

71. The composition of claim 70, including about 0.09% by wt. vanadium.

72. The composite of claim 8, said size being from about 0.1-3 mm.

73. The composite of claim 72, said size being from about 1.5-3 mm.

74. The composite of claim 8, said granules operable to increase the plant availability of said micronutrient.

75. The composite of claim 8, said lower pH portions being acidic microenvironments.

76. The composite of claim 75, said microenvironments having a largest dimension averaging from about 4-8 mm.

77. The composite of claim 75, said acidic microenivronments being maintained for a period of at least about 30 days.

78. The composite of claim 8, said composition including phosphorous.

79. The composite of claim 8, including from about 0.02-74% by wt. zinc.

80. The composite of claim 79, including from about 1-40% by wt. zinc.

81. The composite of claim 8, including from about 0.02-55% by wt. manganese.

82. The composite of claim 81, including from about 2-40% by wt. manganese.

83. The composite of claim 8, including from about 0.02-74% by wt. copper.

84. The composite of claim 83, including from about 1-40% by wt. copper.

85. The composite of claim 8, including from about 0.02-55% by wt. iron.

86. The composite of claim 85, including from about 1-40% by wt. iron.

87. The composite of claim 8, including from about 0.02-18% by wt. boron.

88. The composite of claim 87, including from about 0.05-12% by wt. boron.

89. The composite of claim 8, including from about 0.015-0.025% by wt. nickel.

90. The composite of claim 89, including from bout 0.01-0.02% by wt. nickel.

91. The composite of claim 8, including from about 0.002-0.02% by wt. cobalt.

92. The composite of claim 91, including from about 0.005-0.01% by wt. cobalt.

93. The composite of claim 8, including from about 1-25% by wt. silicon.

94. The composite of claim 93, including about 20% by wt. silicon.

95. The composite of claim 8, including from about 0.005-0.2% by wt. selenium.

96. The composite of claim 95, including about 0.125% by wt. selenium.

97. The composite of claim 8, including from about 0.005-0.2% by wt. vanadium.

98. The composite of claim 97, including about 0.09% by wt. vanadium.

99. The method of claim 14, said size being from about 0.1-3 mm.

100. The method of claim 99 said size being from about 1.5-3 mm.

101. The method of claim 14, said granules operable to increase the plant availability of said micronutrient.

102. The method of claim 14, said lower pH portions being acidic microenvironments.

103. The method of claim 102, said microenvironments having a largest dimension averaging from about 4-8 mm.

104. The method of claim 102, said acidic microenivronments being maintained for a period of at least about 30 days.

105. The method of claim 14, said granules including phosphorous.

106. The method of claim 14, including from about 0.02-74% by wt. zinc.

107. The method of claim 106, including from about 1-40% by wt. zinc.

108. The method of claim 14, including from about 0.02-55% by wt. manganese.

109. The method of claim 108, including from about 2-40% by wt. manganese.

110. The method of claim 14, including from about 0.02-74% by wt. copper.

111. The method of claim 110, including from about 1-40% by wt. copper.

112. The method of claim 14, including from about 0.02-55% by wt. iron.

113. The method of claim 112, including from about 1-40% by wt. iron.

114. The method of claim 14, including from about 0.02-18% by wt. boron.

115. The method of claim 114, including from about 0.05-12% by wt. boron.

116. The method of claim 14, including from about 0.015-0.025% by wt. nickel.

117. The method of claim 116, including from bout 0.01-0.02% by wt. nickel.

118. The method of claim 14, including from about 0.002-0.02% by wt. cobalt.

119. The method of claim 118, including from about 0.005-0.01% by wt. cobalt.

120. The method of claim 14, including from about 1-25% by wt. silicon.

121. The method of claim 120, including about 20% by wt. silicon.

122. The method of claim 14, including from about 0.005-0.2% by wt. selenium.

123. The method of claim 122, including about 0.125% by wt. selenium.

124. The method of claim 14, including from about 0.005-0.2% by wt. vanadium.

125. The method of claim 125, including about 0.09% by wt. vanadium.

126. The composition of claim 4, said granules formed by mixing together said ammonium sulfate, elemental sulfur, and micronutrient, and granulating the mixture.

127. The composition of claim 126, said granulating being carried out after the mixture is formed.

128. The composite of claim 8, said granules formed by mixing together said ammonium sulfate, elemental sulfur, and micronutrient, and granulating the mixture.

129. The composite of claim 128, said granulating being carried out after the mixture is formed.

130. The method of claim 14, said granules formed by mixing together said ammonium sulfate, elemental sulfur, and micronutrient, and granulating the mixture.

131. The method of claim 130, said granulating being carried out after the mixture is formed.

132. A soil nutrient composition in the form of granules comprising a granulated mixture of from about 5-49% by weight ammonium sulfate, from about 2.5-25% by weight elemental sulfur, said weight percentages based upon the total weight of the mixture taken as 100% by weight, and a micronutrient selected from the group consisting of zinc, iron, manganese, copper, boron, cobalt, vanadium, selenium, silicon, nickel and mixtures thereof, the amount of ammonium sulfate present in said granulated mixture being greater than the amount of elemental sulfur therein on a weight basis, said granules having a size of from about 0.1-30 mm and a bulk density of about 30-100 ft.$^3$, said granules being granulated by using equipment comprising a rotary drum granulator or a rotary pan granulator, said granules as formed having a moisture content and are thereafter dried, said granules operable when applied to soil to create lower pH portions within the soil.

133. The composition of claim 132, said granules formed by mixing together said ammonium sulfate, elemental sulfur, and micronutrient, and then granulating the mixture.

134. The composition of claim 132, said granulating being carried out after the mixture is formed.

135. The composition of claim 132, said lower pH portions being acidic microenvironments.

136. The composition of claim 135, said granules serving to lower the pH of said microenvironments about 1-4 pH units, as compared with bulk soil surrounding the microenvironments.

137. The composition of claim 48, said granules serving to lower the pH of said microenvironments about 1-4 pH units, as compared with bulk soil surrounding the microenvironments.

138. The composite of claim 75, said granules serving to lower the pH of said microenvironments about 1-4 pH units, as compared with bulk soil surrounding the microenvironments.

139. The method of claim 102, said granules serving to lower the pH of said microenvironments about 1-4 pH units, as compared with bulk soil surrounding the microenvironments.

140. The composition of claim 135, said microenvironments having a largest dimension averaging from about 4-8 mm.

141. The composition of claim 135, said acidic microenivronments being maintained for a period of at least about 30 days.

142. The composition of claim 4, said granulated composition having a bulk density of from about 30-100 lbs/ft$^3$.

143. The composition of claim 4, said granulated composition having a water solubility of from about 10-100%.

144. The method of claim 14, said granulated composition having a bulk density of from about 30-100 lbs/ft$^3$.

145. The method of claim 14, said granulated composition having a water solubility of from about 10-100%.

146. The composition of claim 4, said mixture being substantially homogeneous.

147. The composite of claim 8, said mixture being substantially homogeneous.

148. The method of claim 14, said mixture being substantially homogeneous.

149. The composition of claim 132, said mixture being substantially homogeneous.

150. The composition of claim 4, said granules operable to be applied to soil by broadcast application, banded application, sidedress application, or any combination thereof.

151. The composite of claim 8, said granules operable to be applied to soil by broadcast application, banded application, sidedress application, or any combination thereof.

152. The method of claim 14, including the step of applying said granules to soil by broadcast application, banded application, sidedress application, or any combination thereof.

153. The composition of claim 132, said granules operable to be applied to soil by broadcast application, banded application, sidedress application, or any combination thereof.

154. The composite of claim 128, said micronutrient being mixed into said mixture as an initially separate micronutrient ingredient.

155. The method of claim 130, said micronutrient being mixed into said mixture as an initially separate micronutrient ingredient.

156. The soil nutrient composition of claim 133, said micronutrient being mixed into said mixture as an initially separate micronutrient ingredient.

* * * * *